US010007316B2

(12) United States Patent
An et al.

(10) Patent No.: US 10,007,316 B2
(45) Date of Patent: Jun. 26, 2018

(54) STATE CONTROL METHOD AND APPARATUS AND PORTABLE TERMINAL

(75) Inventors: Ning An, Beijing (CN); Songtao Lin, Beijing (CN); Chentao Yu, Beijing (CN)

(73) Assignees: LENOVO (BEIJING) LIMITED, Beijing (CN); BEIJING LENOVO SOFTWARE LTD, Beijing (CN)

( * ) Notice: Subject to any disclaimer, the term of this patent is extended or adjusted under 35 U.S.C. 154(b) by 256 days.

(21) Appl. No.: 14/115,195

(22) PCT Filed: May 3, 2012

(86) PCT No.: PCT/CN2012/075018
§ 371 (c)(1),
(2), (4) Date: Nov. 1, 2013

(87) PCT Pub. No.: WO2012/152202
PCT Pub. Date: Nov. 15, 2012

(65) Prior Publication Data
US 2014/0068297 A1    Mar. 6, 2014

(30) Foreign Application Priority Data
May 10, 2011    (CN) .......................... 2011 1 0119709

(51) Int. Cl.
G06F 1/26    (2006.01)
G06F 1/32    (2006.01)
H04W 52/02  (2009.01)

(52) U.S. Cl.
CPC .......... G06F 1/3206 (2013.01); G06F 1/3203 (2013.01); G06F 1/3287 (2013.01);
(Continued)

(58) Field of Classification Search
CPC . G06F 1/3203; G06F 1/3287; Y02B 60/1217; Y02D 70/142
See application file for complete search history.

(56) References Cited

U.S. PATENT DOCUMENTS 5,905,900 A * 5/1999 Combs .................. G06F 1/3203
                                                    713/320
5,925,134 A * 7/1999 Solomon ............... G06F 1/3215
                                                    713/324
(Continued)

FOREIGN PATENT DOCUMENTS

CN    101387843 A    3/2009
CN    101424971 A    5/2009
(Continued)

OTHER PUBLICATIONS

English translation of Abstract of Chinese Patent No. 102104936 A.
(Continued)

*Primary Examiner* — Jaweed A Abbaszadeh
*Assistant Examiner* — Gayathri Sampath (57) ABSTRACT

The embodiments of the present application provide a method and a state control apparatus as well as a portable terminal. The method is applied in a first system connected to a second system and includes: detecting, by the first system, a first event; determining a first state of the first system and a second state of the second system when the first event is a first predetermined event; obtaining a predetermined policy including a first control command and a second control command based on the first state of the first system, the second state of the second system and the first predetermined event; and controlling, by the first system, its own state based on the first control command and transmitting the second control command to the second system such that the second system is switched from the second state to a fourth state. The second system has different power consumptions in the second state and the fourth state. With the embodiments of the present application, in a portable terminal of hybrid system architecture, the system states of the first and second systems can be controlled in a coordi- (Continued)

nated manner, such that the power consumption can be reduced when both systems are operating cooperatively.

13 Claims, 4 Drawing Sheets

(52) U.S. Cl.
CPC ....... *H04W 52/0254* (2013.01); *Y02D 70/142* (2018.01); *Y02D 70/144* (2018.01)

(56) References Cited

U.S. PATENT DOCUMENTS

| | | | | |
|---|---|---|---|---|
| 8,717,371 B1* | 5/2014 | Wyatt | ................ | G06F 1/32 345/502 |
| 2002/0085348 A1* | 7/2002 | Dai | ................ | G06F 1/1626 361/679.29 |
| 2003/0112585 A1* | 6/2003 | Silvester | ................ | G06F 1/1616 361/679.41 |
| 2005/0273635 A1* | 12/2005 | Wilcox | ................ | G06F 1/26 713/320 |
| 2009/0077277 A1* | 3/2009 | Vidal | ................ | G06F 1/3203 710/46 |
| 2009/0077400 A1* | 3/2009 | Enami | ................ | G06F 1/266 713/320 |
| 2009/0177898 A1* | 7/2009 | Huang | ................ | G06F 1/3203 713/300 |
| 2011/0093724 A1* | 4/2011 | Park | ................ | G06F 1/3203 713/300 |
| 2011/0320405 A1* | 12/2011 | Hsu | ................ | G06F 1/1632 707/634 |
| 2012/0159218 A1* | 6/2012 | Vangala | ................ | G06F 9/5094 713/323 |
| 2012/0176746 A1* | 7/2012 | Chen | ................ | G06F 1/1616 361/679.55 |

FOREIGN PATENT DOCUMENTS

| | | | |
|---|---|---|---|
| CN | 101685338 A | 3/2010 |
| CN | 101714021 A | 5/2010 |
| CN | 102033850 A | 4/2011 |
| CN | 102104936 A | 6/2011 |

OTHER PUBLICATIONS

English translation of Abstract of Chinese Patent No. 101714021 A.
English translation of Abstract of Chinese Patent No. 101685338 A.
English translation of Abstract of Chinese Patent No. 102033850 A.
English translation of Abstract of Chinese Patent No. 101387843 A.
English translation of Abstract of Chinese Patent No. 101424971 A.
English Abstract of CN101387843A (1pg.).
English Absract of CN101424971A (1pg).
English Abstract of CN101685338A (1pg).
English Abstract of CN101714021A (1pg).
English Abstract of CN102033850A (1pg).

\* cited by examiner

STATE CONTROL METHOD AND APPARATUS AND PORTABLE TERMINAL

CROSS REFERENCE TO RELATED APPLICATIONS

This application is based on International Application No. PCT/CN2012/075018 filed on May 3, 2012, which claims priority to Chinese National Application No. 201110119709.X, filed on May 10, 2011, the contents of which are incorporated herein by reference.

TECHNICAL FIELD

The present invention relates to communication technology, and more particularly, to a state control method and a state control apparatus as well as a portable terminal.

BACKGROUND

A portable terminal of hybrid system architecture is a Personal Computer (PC) in which at least one further system is embedded into a conventional PC having only one system. Different systems can function cooperatively to achieve their respective advantages. Currently, a typical portable terminal of hybrid system architecture has a master system (e.g., x86 system) and a slave system (e.g., ARM system) integrated therein. The master system and the slave system can share their devices. In a notebook computer as an example, its slave system can function independently as a tablet computer and its master system can function independently as a host of a portable notebook computer. The user of the notebook computer can either separate these systems or connect them as an integrated system. When the user selects to use them as an integrated system, the slave system may provide the master system with an additional 3G network support, or they can be connected for synchronization of data information.

During the research on power management of the conventional portable terminal of hybrid system architecture, the inventors have recognized that the Dynamic Power Management (DPM) technique can be adopted in order to save power and increase battery lifetime of the portable terminal. Depending on the variation of the operational load of the system, the DPM technique can selectively configure system resources into a low power consumption mode by lowering or turning off the voltage or frequency of at least one circuit module when it is idle, such that the power consumption of the system can be reduced. However, this power-saving technique is designed for the standalone system architecture. That is, when applied to a portable terminal of hybrid system architecture, the above technique can only save the power consumption of the master or slave system when it is operating independently, but cannot achieve power-saving when both systems are operating cooperatively.

SUMMARY

It is an object of the present application to provide a state control method and a state control apparatus, as well as a portable terminal, capable of solving the problem in the prior art that it is difficult to reduce the power consumption of a portable terminal of hybrid system architecture when both of its systems are operating cooperatively.

In order to solve the above problem, the following solutions are provided according to the embodiments of the present application.

A state control method is provided. The method is applied in a first system connected to a second system and includes: detecting, by the first system, a first event; determining a first state of the first system and a second state of the second system when the first event is a first predetermined event; obtaining a predetermined policy including a first control command and a second control command based on the first state of the first system, the second state of the second system and the first predetermined event; and the first system controlling its own state based on the first control command and transmitting the second control command to the second system such that the second system is switched from the second state to a fourth state. The second system has different power consumptions in the second state and the fourth state.

The first system controlling its own state based on the first control command includes: the first system maintaining its own state based on the first control command; or the first system switching its own state from the first state to a third state. The first system has different power consumptions in the first state and the third state.

The first predetermined event detected by the first system includes: a predetermined event detected by the first system that causes an increased power consumption of the second system; or a predetermined event detected by the first system that causes a decreased power consumption of the second system.

The predetermined event detected by the first system that causes an increased power consumption of the second system includes at least one of: an event in which the first system detects that the first system is powered on in response to a user operation; an event in which the first system detects that the first system is waked in response to a user operation; and an event in which the first system detects that the first system needs to use a communication module of the second system.

The predetermined policy includes at least one of: a policy to generate the first control command and the second control command for switching the first system and the second system from a power-off state to an active state, respectively, when the first state of the first system and the second state of the second system are both in the power-off state and the first predetermined event is the event in which the first system is powered on in response to a user operation; a policy to generate the first control command for controlling the first system to maintain an active state and the second control command for controlling the second system to enter an communication state when the first state of the first system and the second state of the second system are both in the active state and the first predetermined event is the event in which the first system needs to use the communication module of the second system; a policy to generate the first control command and the second control command for switching the first system and the second system from a dormant state to an active state, respectively, when the first state of the first system and the second state of the second system are both in the dormant state and the first predetermined event is the event in which the first system is waked in response to a user operation; a policy to generate the first control command for switching the first system from a power-off state to an active state and the second control command for switching the second system from a dormant state to an active state when the first state of the first system is in the power-off state, the second state of the second system is in the dormant state and the first predetermined event is the event in which the first system is powered on in response to a user operation; and a policy to generate the first control command for switching the first system from a dormant state to an active state and the second control command for switching the second system from a power-off state to an active state when the first state of the first system is in the dormant state, the second state of the second system is in the power-off state and the first predetermined event is the event in which the first system is waked in response to a user operation.

The predetermined event detected by the first system that causes a decreased power consumption of the second system includes at least one of: an event in which the first system detects that the first system is powered off in response to a user operation; an event in which the first system detects that the first system is controlled to dormant in response to a user operation; an event in which the first system detects that a power level of the first and second systems is lower than a predetermined threshold; and an event in which the first system detects that the first system needs to stop using a communication module of the second system.

The predetermined policy includes at least one of: a policy to generate the first control command and the second control command for switching the first system and the second system from an active state to a power-off state, respectively, when the first state of the first system and the second state of the second system are both in the active state and the first predetermined event is the event in which the power level of the first and second systems is lower than the predetermined threshold; a policy to generate the first control command for switching the first system from an active state to a power-off state and the second control command for switching the second system from a communication state to an active state when the first state of the first system is in the active state, the second state of the second system is in the communication state and the first predetermined event is the event in which the first system is powered off in response to a user operation; a policy to generate the first control command for switching the first system from an active state to a dormant state and the second control command for switching the second system from a communication state to a dormant state when the first state of the first system is in the active state, the second state of the second system is in the communication state and the first predetermined event is the event in which the first system is controlled to dormant in response to a user operation; and a policy to generate the first control command for controlling the first system to maintain an active state and the second control command for switching the second system from a communication state to an active state when the first state of the first system is in the active state, the second state of the second system is in the communication state and the first predetermined event is the event in which the first system needs to stop using the communication module of the second system.

A state control method is provided. The method is applied in a second system connected to a first system and includes: receiving, by the second system, a second control command transmitted from the first system; and switching the second system from a second state to a fourth state based on the second control command, the second system having different power consumptions in the second state and the fourth state. The second control command is transmitted by the first system according to a predetermined policy after the predetermined policy is obtained by the first system, upon detecting a first predetermined event, based on a first state of the first system, a second state of the second system and the first predetermined event.

A state control apparatus is provided. The apparatus is applied in a first system connected to a second system and includes: a detection unit configured to detect a first event; a determination unit configured to detect a first state of the first system and a second state of the second system when the first event is a first predetermined event; an obtaining unit configured to obtain a predetermined policy including a first control command and a second control command based on the first state of the first system, the second state of the second system and the first predetermined event; and a control unit configured to control the first system's own state based on the first control command and transmit the second control command to the second system such that the second system is switched from the second state to a fourth state. The second system has different power consumptions in the second state and the fourth state.

The control unit includes at least one of: a first control unit configured to maintain the first system's own state based on the first control command; and a second control unit configured to switch the first system's own state from the first state to a third state. The first system has different power consumptions in the first state and the third state.

The detection unit includes at least one of: a first detection unit configured to detect a predetermined event that causes an increased power consumption of the second system; or a second detection unit configured to detect a predetermined event that causes a decreased power consumption of the second system.

The predetermined event detected by the first detection unit includes at least one of: an event in which the first detection unit detects that the first system is powered on in response to a user operation; an event in which the first detection unit detects that the first system is waked in response to a user operation; and an event in which the first detection unit detects that the first system needs to use a communication module of the second system.

The predetermined policy includes at least one of: a policy to generate the first control command and the second control command for switching the first system and the second system from a power-off state to an active state, respectively, when the first state of the first system and the second state of the second system are both in the power-off state and the first predetermined event is the event in which the first system is powered on in response to a user operation; a policy to generate the first control command for controlling the first system to maintain an active state and the second control command for controlling the second system to enter an communication state when the first state of the first system and the second state of the second system are both in the active state and the first predetermined event is the event in which the first system needs to use the communication module of the second system; a policy to generate the first control command and the second control command for switching the first system and the second system from a dormant state to an active state, respectively, when the first state of the first system and the second state of the second system are both in the dormant state and the first predetermined event is the event in which the first system is waked in response to a user operation; a policy to generate the first control command for switching the first system from a power-off state to an active state and the second control command for switching the second system from a dormant state to an active state when the first state of the first system is in the power-off state, the second state of the second system is in the dormant state and the first predetermined event is the event in which the first system is powered on in response to a user operation; and a policy to generate the first control command for switching the first system from a dormant state to an active state and the second control command for switching the second system from a power-off state to an active state when the first state of the first system is in the dormant state, the second state of the second system is in the power-off state and the first predetermined event is the event in which the first system is waked in response to a user operation.

The predetermined event detected by the second detection unit includes at least one of: an event in which the second detection unit detects that the first system is powered off in response to a user operation; an event in which the second detection unit detects that the first system is controlled to dormant in response to a user operation; an event in which the second detection unit detects that a power level of the first and second systems is lower than a predetermined threshold; and an event in which the second detection unit detects that the first system needs to stop using a communication module of the second system.

The predetermined policy includes at least one of: a policy to generate the first control command and the second control command for switching the first system and the second system from an active state to a power-off state, respectively, when the first state of the first system and the second state of the second system are both in the active state and the first predetermined event is the event in which the power level of the first and second systems is lower than the predetermined threshold; a policy to generate the first control command for switching the first system from an active state to a power-off state and the second control command for switching the second system from a communication state to an active state when the first state of the first system is in the active state, the second state of the second system is in the communication state and the first predetermined event is the event in which the first system is powered off in response to a user operation; a policy to generate the first control command for switching the first system from an active state to a dormant state and the second control command for switching the second system from a communication state to a dormant state when the first state of the first system is in the active state, the second state of the second system is in the communication state and the first predetermined event is the event in which the first system is controlled to dormant in response to a user operation; and a policy to generate the first control command for controlling the first system to maintain an active state and the second control command for switching the second system from a communication state to an active state when the first state of the first system is in the active state, the second state of the second system is in the communication state and the first predetermined event is the event in which the first system needs to stop using the communication module of the second system.

A state control apparatus is provided. The apparatus is applied in a second system connected to a first system and includes: a reception unit configured to receive a second control command transmitted from the first system; and a control unit configured to switch the second system from a second state to a fourth state based on the second control command, the second system having different power consumptions in the second state and the fourth state. The second control command is transmitted by the first system according to a predetermined policy after the predetermined policy is obtained by the first system, upon detecting a first predetermined event, based on a first state of the first system, a second state of the second system and the first predetermined event.

A portable terminal is provided. The portable terminal includes a first system and a second system connected to the first system. The first system is configured to: detect a first event, determine a first state of the first system and a second state of the second system when the first event is a first predetermined event, obtain a predetermined policy including a first control command and a second control command based on the first state of the first system, the second state of the second system and the first predetermined event, and control its own state based on the first control command and transmit the second control command to the second system. The second system is switched from the second state to a fourth state based on the second control command, the second system having different power consumptions in the second state and the fourth state.

The first system is further configured to control state transition of the first system based on its own state transition policy after being disconnected from the second system, the power consumption of the first system after the state transition being different from that before the state transition. The second system is further configured to control state transition of the second system based on its own state transition policy after being disconnected from the first system, the power consumption of the second system after the state transition being different from that before the state transition.

In the above solutions according to the embodiments of the present invention, a first system is connected to a second system. The first system detects a first event, determines a first state of the first system and a second state of the second system when the first event is a first predetermined event and obtains a predetermined policy including a first control command and a second control command based on the first state of the first system, the second state of the second system and the first predetermined event. The first system controls its own state based on the first control command and transmits the second control command to the second system such that the second system is switched from the second state to a fourth state. The second system has different power consumptions in the second state and the fourth state. With the embodiments of the present application, in a portable terminal of hybrid system architecture, the system states of the first and second systems can be controlled in a coordinated manner by providing a state control process when they are connected, such that the power consumption can be reduced when both systems are operating cooperatively.

BRIEF DESCRIPTION OF THE DRAWINGS

In order to illustrate the solutions according to the embodiments of the present application or the prior art in further detail, the figures used for description of the embodiments or the prior art will be introduced briefly here. It is apparent to those skilled in the art that other figures can be obtained from the figures introduced below without applying any inventive skills.

DETAILED DESCRIPTION OF THE EMBODIMENTS

A method and a state control apparatus as well as a portable terminal are provided according to the embodiments of the present application as described below.

The solutions according to the embodiments of the present application will be further detailed in the following with reference to the figures, such that these solutions can be better understood by those skilled in the art and the above objects, features and advantages of the embodiments will be more apparent.

The state control method according to the present application is applied in a hybrid system consisting of a first system and a second system. Here, the hybrid system may be composed of two separate terminals or may be one terminal including the first system and the second system. For example, the hybrid system can be composed of a notebook computer having a single system and a smart phone, or can be a notebook computer having a hybrid system.

Here, the first system may include a first hardware system, e.g., a master system based on an X86 architecture or ARM architecture processor. The second system may include a second hardware system, e.g., a slave system based on an X86 architecture or ARM architecture processor. That is, the first and second systems can be constructed based on the same hardware architecture or different hardware architectures. Moreover, the master system and the slave system can be distinguished from each other in terms of importance, priority, processing capability or power consumption (e.g., the master system may have higher importance, higher priority, higher processing capability and higher power consumption, in relative to the slave system). Alternatively, the terms "master" and "slave" are notations only, and do not necessarily imply any difference between these systems with respect to importance, priority, processing capability or power consumption.

Further, the first system may include a first hardware system having a first operating system, e.g., a first hardware system configured with a desktop device operating system (such as Windows 7, Linux or MacOS) or a portable device operating system (such as Android, Symbian or iOS). The second system may include a second hardware system having a second operating system, e.g., a second hardware system configured with a desktop device operating system (such as Windows 7, Linux or MacOS) or a portable device operating system (such as Android, Symbian or iOS). That is, the first and second operating systems can be identical to, or different from, each other, as long as they can run on their respective hardware systems. Preferably, the first system is a master system based on an X86 architecture processor and configured with a desktop operating system, while the second system is a slave system based on an ARM architecture processor and configured with a portable device operating system.

Here, the first system has a first interface and the second system has a second interface. The first system and the second system can be attached to, or detached from, each other via the first and second interfaces. Each of the first and second interfaces can be a wired or wireless interface. The present application is not limited thereto, as long as the first system and the second system can be attached to or detached from each other via the first and second interfaces and can exchange system state information with each other.

When the first and second interfaces are wired interfaces, the first interface can be a Universal Serial Bus (USB) interface, a Universal Asynchronous Receiver/Transmitter (UART) interface or a custom interface that allows the first system to be attached to or detached from the second system. In this case, the second interface can be a corresponding USB, UART or custom interface that allows the second system to be attached to or detached from the first system. When the first and second interfaces are wireless interfaces, they can be paired Bluetooth interfaces, infrared interfaces or WiFi interfaces.

In a notebook computer having a hybrid system as an example, the first and second systems can be two systems independent from each other and can operate separately or can operate while being attached together. The first system is provided at the host side as in a notebook computer having a single system and has a processing device and an input device but no display device. The second system is provided at the display screen side as in a notebook computer having a single system and has a processing device, an input device and a display device. In the case where the first and second systems operate while being attached together, these systems can share one or more hardware devices such as the display device. Since the display device is integrated with the second system, when the first system is detached or pulled out from the second system, the display device can only be used by the second system. When the master system is attached or pushed to the slave system, the display device can be used by the first system and the second system. That is, operation results of the first and/or second systems can be displayed at the display device.

In the embodiments, for each of the master and slave systems, its system state can include, by definition, an active state and an inactive state. Further, the inactive state can be subdivided into a low-power-consumption state and a power-consumption-free state. Here, the active state is the state in which the system operates normally. The low-power-consumption state can include a standby state and a sleep state. The power-consumption-free state can include a power-off state and a dormant state. Further, the slave system can have a communication state in which it serves as e.g., a 3G network card. When the slave system is in the communication state, the master system can access the internet via the slave system. Among the states described above, the power consumption in the active state is typically higher than the power consumptions in the inactive state and the communication state. In the inactive states, the power consumption in the low-power-consumption state is higher than the power consumption in the power-consumption-free state.

The above states will be explained below.

Normal operation state: This is a state in which all of the devices in the system, including the memory, are powered on.

Standby state: When the system is switched to this state, all the devices other than the memory are powered off while the memory is still powered on to maintain the data therein. The system can directly recover from the standby state to the state before the standby state.

Dormant state: When the system is switched to this state, it will automatically transfer all the data in the memory to a dormancy file in the hard drive and then shut down the power supply to all of the devices. The system can directly load the content of the dormancy file from the hard drive into the memory and recover to the state before the dormant state.

Sleep state: This state combines all the advantages of the standby state and the dormant state. When the system is switched to this state, it will transfer all the data in the memory to a dormancy file in the hard drive and then shut down the power supply to all the devices other than the memory. If there is no power supply abnormity during the sleep state, the system can directly read the data from the memory and recover to the state before the sleep state quickly. However, if there is a power supply abnormity during the sleep state which results in data loss in the memory, the system can recover the data from the hard drive, which is slower than recovering the data from the memory.

Power-off state: This is a state in which the memory and all other hardware devices in the system are powered off.

In accordance with the definition of system states in the Advanced Configuration and Power Interface (ACPI) specification, the normal operation state is denoted as S0, the standby state is denoted as S3, the dormant state is denoted as S4 and the power-off state is denoted as S5. For the purpose of convenience, in the present application the sleep state is denoted as A1 and the communication state is denoted as A2.

Figure 1:
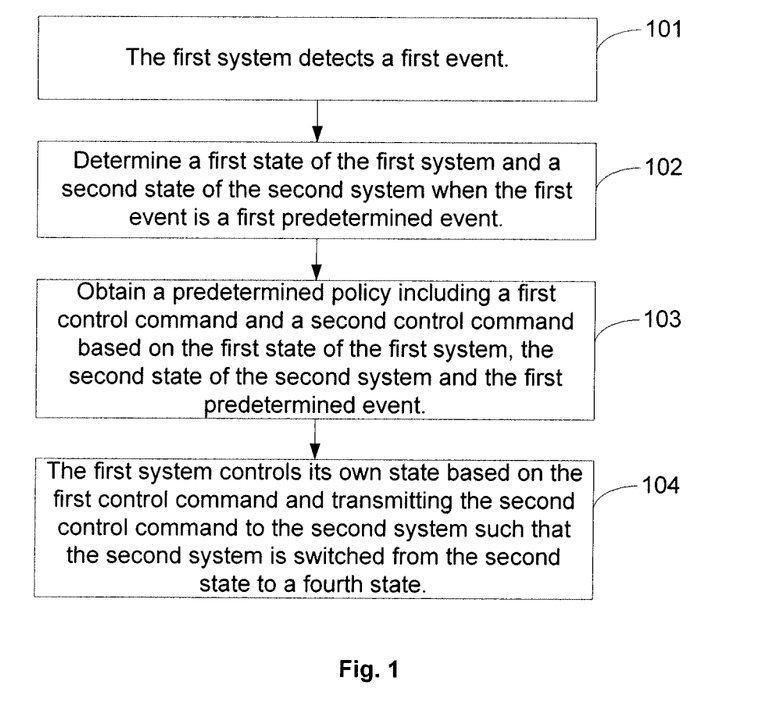
FIG. 1 is a flowchart illustrating a first embodiment of the state control method according to the present application.

Reference is now made to FIG. 1 which is a flowchart illustrating a first embodiment of the state control method according to the present application. In this embodiment, the state control process when the first and second systems are attached together is shown from the perspective of the first system.

At step 101, the first system detects a first event.

At step 102, when the first event is a first predetermined event, a first state of the first system and a second state of the second system are determined.

The first predetermined event detected by the first system can include: a predetermined event that causes an increased power consumption of the second system; or a predetermined event that causes a decreased power consumption of the second system. Here, the first event is detected at the first system side.

The predetermined event that causes an increased power consumption of the second system can include at least one of: an event in which the first system detects that the first system is powered on in response to a user operation; an event in which the first system detects that the first system is waked in response to a user operation; and an event in which the first system detects that the first system needs to use a communication module of the second system.

The predetermined event that causes a decreased power consumption of the second system can include at least one of: an event in which the first system detects that the first system is powered off in response to a user operation; an event in which the first system detects that the first system is controlled to dormant in response to a user operation; an event in which the first system detects that a power level of the first and second systems is lower than a predetermined threshold; and an event in which the first system detects that the first system needs to stop using a communication module of the second system.

Triggered by the detection of the first predetermined event, i.e., based on the detected first predetermined event, the first state of the first system and the second state of the second system are determined.

At step 103, a predetermined policy including a first control command and a second control command is obtained based on the first state of the first system, the second state of the second system and the first predetermined event.

The predetermined policy includes at least one of:

a policy to generate the first control command and the second control command for switching the first system and the second system from a power-off state to an active state, respectively, when the first state of the first system and the second state of the second system are both in the power-off state and the first predetermined event is the event in which the first system is powered on in response to a user operation;

a policy to generate the first control command for controlling the first system to maintain an active state and the second control command for controlling the second system to enter an communication state when the first state of the first system and the second state of the second system are both in the active state and the first predetermined event is the event in which the first system needs to use the communication module of the second system;

a policy to generate the first control command and the second control command for switching the first system and the second system from a dormant state to an active state, respectively, when the first state of the first system and second state of the second system are both in the dormant state and the first predetermined event is the event in which the first system is waked in response to a user operation;

a policy to generate the first control command for switching the first system from a power-off state to an active state and the second control command for switching the second system from a dormant state to an active state when the first state of the first system is in the power-off state, the second state of the second system is in the dormant state and the first predetermined event is the event in which the first system is powered on in response to a user operation;

a policy to generate the first control command for switching the first system from a dormant state to an active state and the second control command for switching the second system from a power-off state to an active state when the first state of the first system is in the dormant state, the second state of the second system is in the power-off state and the first predetermined event is the event in which the first system is waked in response to a user operation a policy to generate the first control command and the second control command for switching the first system and the second system from an active state to a power-off state, respectively, when the first state of the first system and the second state of the second system are both in the active state and the first predetermined event is the event in which the power level of the first and second systems is lower than the predetermined threshold;

a policy to generate the first control command for switching the first system from an active state to a power-off state and the second control command for switching the second system from a communication state to an active state when the first state of the first system is in the active state, the second state of the second system is in the communication state and the first predetermined event is the event in which the first system is powered off in response to a user operation;

a policy to generate the first control command for switching the first system from an active state to a dormant state and the second control command for switching the second system from a communication state to a dormant state when the first state of the first system is in the active state, the second state of the second system is in the communication state and the first predetermined event is the event in which the first system is controlled to dormant in response to a user operation; and a policy to generate the first control command for controlling the first system to maintain an active state and the second control command for switching the second system from a communication state to an active state when the first state of the first system is in the active state, the second state of the second system is in the communication state and the first predetermined event is the event in which the first system needs to stop using the communication module of the second system.

At step 104, the first system controls its own state based on the first control command and transmitting the second control command to the second system such that the second system is switched from the second state to a fourth state.

Here, when the first system controls its own state based on the first control command, the first system can maintain its own state based on the first control command or switch its own state from the first state to a third state. The first system has different power consumptions in the first state and the third state. The second system has different power consumptions in the second state and the fourth state.

Figure 2:
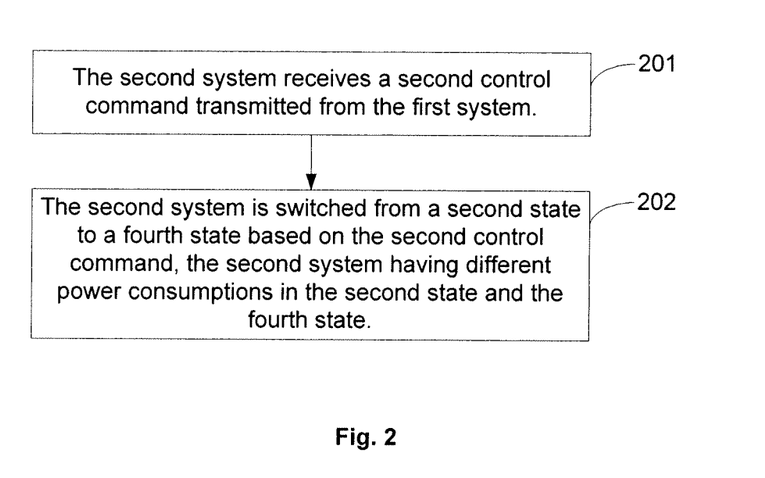
FIG. 2 is a flowchart illustrating a second embodiment of the state control method according to the present application.

Reference is now made to FIG. 2 which is a flowchart illustrating a second embodiment of the state control method according to the present application. In this embodiment, the state control process when the first and second systems are attached together is shown from the perspective of the second system.

At step 201, the second system receives a second control command transmitted from the first system.

At step 202, the second system is switched from a second state to a fourth state based on the second control command. The second system has different power consumptions in the second state and the fourth state.

Here, the second control command is transmitted by the first system according to a predetermined policy after the predetermined policy is obtained by the first system, upon detecting a first predetermined event, based on a first state of the first system, a second state of the second system and the first predetermined event.

With reference to the above two embodiments, examples of system state control according to the present application will be explained in detail. It is assumed that the first system is a master system, the second system is a slave system, and the first system is connected to the second system. The entire process for controlling the states of the master and slave systems in a coordinated manner when they are connected will be described in the following.

1) The master system is in the state S4 or S5 and the slave system is in the state S4 or S5. The user operates the power button of the master system. In this case, since the master system and the slave system are operating cooperatively, when the user presses the power button of the master system, the master system enters the state S0 and the slave system enters the state S0. In a notebook computer with dual systems as an example, when the master system is powered on, the current operation result of the master system cannot be seen since the master system does not have a display component. At this time, the slave system is activated automatically in coordination with the master system, such that the user can directly view the operation result displayed on the display device integrated in the slave system. The time required for the user to press a button for activating the slave system separately can be saved as compared with the prior art.

2) The master system is in the state S0 and the slave system is in the state S0. The user operates the power button of the master system or performs any other operation to power off the master system. In this case, the slave system is not powered off, but operates in its own state. The master system enters the state S5 while the slave system maintains its state S0. In a notebook computer with dual systems as an example, when the master system is switched from the active state to the power-consumption-free state, the slave system itself may still need to use the display device. Therefore, only the master system enters the power-consumption-free state while the slave system maintains its original active state, so as to avoid any interruption in the user's operation on the slave system by preventing the slave system from entering the power-consumption-free state together with the master system.

3) The master system is in the state S0 and the slave system is in the state S0. The master system enters the standby or sleep state in response to a user operation. In this case, the master system and the slave system enter the state S3 or A1.

4) The master system is in the state S0 and the slave system is in the state S0. If both the master system and the slave system are at low power levels and are not connected to any charger for charging, each of the master and slave systems enters the state S5. In a notebook computer with dual systems as an example, if both the master system and the slave system are at low power levels, the master system will enter the power-off state and the slave system will enter the power-off state in coordination with the master system without being controlled separately. In this way, the time required for the user to separately power off the master and slave systems can be saved.

5) The master system is in the state S0 and the slave system is in the state S0. When the master system accesses a network using a 3G module of the slave system, the master system maintains its state S0 and the slave system enters the state A2. At this time, it is necessary to ensure that the slave system does not enter the state A4. When the slave system serves as the 3G module for the master system to access the network, the continuity of the network connectivity can be ensured by controlling the slave system not to enter the dormant state, such that the network connection of the master system will not be interrupted.

6) The master system is in the state S3, S4 or A1 and the slave system is in the state S0. The user operates the power button of the master system or performs any other operation to power off the master system. In this case, the slave system is not powered off, but operates in its own state. The master system enters the state S5 while the slave system maintains its state S0.

7) The master system is in the state S3, S4 or A1 and the slave system is in the state S0. The master system is waked by the user and the slave system maintains its state. The master system enters the state S0 and the slave system maintains its state S0.

8) The master system is in the state S3, S4 or A1 and the slave system is in the state S0. The slave system enters the dormant state after having not been used for a long period of time. In this case, the master system maintains its state S3, S4 or A1 and the slave system enters the state S4.

9) The master system is in the state S0 and the slave system is in the state A2. The user operates the power button of the master system or performs any other operation to power off the master system. In this case, the slave system is not powered off, but operates in its own state. The master system enters the state S5 and the slave system enters the state S0. In a notebook computer with dual systems as an example, when the master system is switched from the active state to the power-consumption-free state, although the master system does not use the 3G module of the slave system any more, the slave system itself may still need to use the display device. Therefore, only the master system enters the power-consumption-free state while the slave system enters the normal operation state, so as to avoid any interruption in the user's operation on the slave system by preventing the slave system from entering the power-consumption-free state together with the master system.

10) The master system is in the state S0 and the slave system is in the state A2. The master system enters the dormant state in response to a user operation. In this case, the master system enters the state S4 and the slave system enters the state S3 or A1.

11) The master system is in the state S0 and the slave system is in the state A2. When the master system stops accessing to the 3G network, the 3G module is turned off. Then the master system maintains its state S0 and the slave system enters the state S0.

12) The master system is in the state S3, S4 or A1 and the slave system is in the state S3, S4 or A1. The user operates the power button of the master system or performs any other operation to power off the master system. In this case, the slave system is not powered off, but operates in its own state. The master system enters the state S5 and the slave system maintains its state S3, S4 or A1.

13) The master system is in the state S3, S4 or A1 and the slave system is in the state S3, S4 or A1. The master system is waked by the user. The master system enters the state S0 and the slave system enters the state S0. In a notebook computer with dual systems as an example, when the master system is powered on, the current operation result of the master system cannot be seen since the master system does not have a display component. When the master system enters the normal operation state, the slave system is activated automatically in coordination with the master system, such that the user can directly view the operation result displayed on the display device integrated in the slave system. The time required for the user to press a button for activating the slave system separately can be saved as compared with the prior art.

14) The master system is in the state S5 and the slave system is in the state S0. The user operates the power button of the master system to power on the master system. One or more devices of the slave system can be used by the master system. The master system enters the state S0 and the slave system maintains its state S0.

15) The master system is in the state S4 or S5 and the slave system is in the state S0. The slave system has not been used for a long period of time. In this case, the master system maintains its state S4 or S5 and the slave system enters the state S3.

16) The master system is in the state S5 and the slave system is in the state S3. The user operates the power button of the master system to power on the master system. The master system enters the state S0 and the slave system enters the state S0.

17) The master system is in the state S3, S4 or A1 and the slave system is in the state S5. The master system is waked by the user. The master system enters the state S0 and the slave system enters the state S0.

18) The master system is in the state S3, S4 or A1 and the slave system is in the state S5. The user operates the power button of the master system or performs any other operation to power off the master system. The master system enters the state S5 and the slave system maintains its state S5.

19) The master system is in the state S3, S4 or A1 and the slave system is in the state S3, S4 or A1. The slave system is waked by a Short Message Service (SMS) message or a calendar alert and the master system maintains its state. That is, the master system maintains its state S3, S4 or A1 and the slave system enters the state S0.

20) The master system is in the state S5 and the slave system is in the state S3, S4 or A1. The slave system is waked by a Short Message Service (SMS) message or a calendar alert and the master system maintains its state. That is, the master system maintains its state S5 and the slave system enters the state S0.

In the above embodiments, the process for system state control is performed based on the event trigger and the predetermined policy when the first system and the second system are attached (i.e., in the attached mode). In addition, the processes for system state control when the first system and the second system are switched from the attached mode to the detached mode or from the detached mode to the attached mode are also provided.

Figure 3:
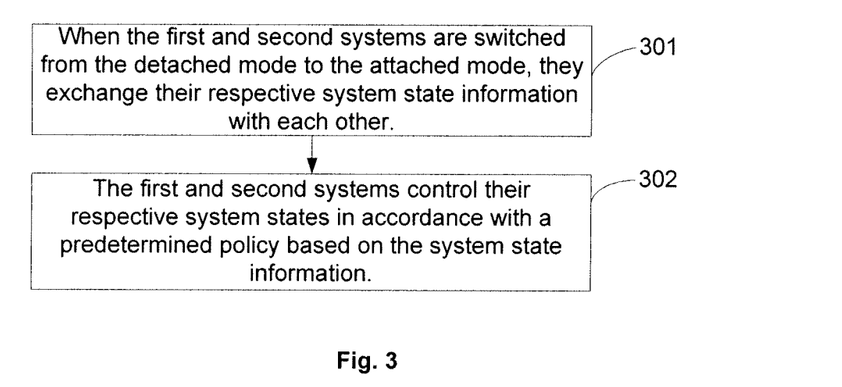
FIG. 3 is a flowchart illustrating a third embodiment of the state control method according to the present application.

Reference is now made to FIG. 3 which is a flowchart illustrating a third embodiment of the state control method according to the present application. This embodiment describes the state control process when the first and second systems are switched from the detached mode to the attached mode.

At step 301, when the first and second systems are switched from the detached mode to the attached mode, they exchange their respective system state information with each other.

At step 302, the first and second systems control their respective system states in accordance with a predetermined policy based on the system state information.

Here, in accordance with the predetermined policy, if the first system and the second system are in the same system state (i.e., the active state or the inactive state) when they are detached, they can maintain their respective system states after they are attached. Alternatively, if one of the first system and the second system is in the active state and the other is in the inactive state when they are detached, the system in the inactive state will automatically enter the active state after they are attached.

There are two schemes for the system state control, as described in the following.

In the first scheme, the first system controls its own system state in accordance with a predetermined policy based on the system state information of its own and the system state information of the second system. Meanwhile, the second system controls its own system state in accordance with a predetermined policy based on the system state information of its own and the system state information of the first system.

In the second scheme, the first system controls the system state of its own and the system state of the second system in accordance with a predetermined policy based on the system state information of its own and the system state information of the second system. Alternatively, the second system controls the system state of its own and the system state of the first system in accordance with a predetermined policy based on the system state information of its own and the system state information of the first system. Further, the first system may control the system state of the second system in accordance with a predetermined policy based only on the system state information of the second system. Alternatively, the second system may control the system state of the first system in accordance with a predetermined policy based only on the system state information of the first system.

With reference to the third embodiment as described above, the control process for state transition will be explained below. Here it is again assumed that the first system is a master system and the second system is a slave system. It is further assumed that the first and second systems are switched from the detached mode to the attached mode.

1) If the master system is in the state S0 and the slave system is in the state S0 when they are detached, they will both maintain the state S0 after being attached.

2) If the master system is in the state S0 and the slave system is in the state S3 when they are detached, then after they are attached, the master system will maintain its state S0 and the slave system will be automatically waked and switched from the state S3 to the state S0. According to the above schemes for system state control in the above embodiment, after the master and slave systems are attached, the master system will maintain its own system state and automatically wake the slave system to switch its system state from the state S3 to the state S0, based on the system state S3 of the slave system and the system state S0 of its own. Alternatively, after the master and slave systems are attached, the master system will maintain its own system state based on the system state S3 of the slave system and the system state S0 of its own and the slave system will switch its own system state from the state S3 to the state S0 based on the system state of the master system and the system state of its own. Alternatively, the slave system may switch its own system state from the state S3 to the state S0 while controlling the master system to maintain its own state, based on the system state of the master system and the system state of its own. In a notebook computer with dual systems as an example, when the two systems operating separately are attached together, since the master system needs to use the display device of the slave system, it automatically controls the slave system to enter the active state. In this way, the time required for the user to press a button for activating the slave system separately can be saved.

3) If the master system is in the state S0 and the slave system is in the state S4 or S5 when they are detached, then after they are attached, the master system will maintain its state S0 and the slave system will be automatically activated and switched from the state S4 or S5 to the state S0. The above three schemes also apply and the details thereof will be omitted here.

4) If the master system is in the state S3 and the slave system is in the state S0 when they are detached, then after they are attached, the slave system will maintain its state S0 and the master system will be automatically activated and switched from the state S3 to the state S0. The above three schemes also apply and the details thereof will be omitted here. In a notebook computer with dual systems as an example, when the two systems operating separately are attached together, it means that the master system and the slave system need to operate cooperatively. Thus, the master system is automatically controlled to enter the active state.

In this way, the time required for the user to press a button for activating the master system separately can be saved.

5) If the master system is in the state S3 and the slave system is in the state S3 when they are detached, then after they are attached, each of the master system and the slave system will maintain the state S3. The above three schemes also apply and the details thereof will be omitted here.

6) If the master system is in the state S3 and the slave system is in the state S4 or S5 when they are detached, then after they are attached, the master system will maintain its state S3 and the slave system will maintain its state S4 or S5. The above three schemes also apply and the details thereof will be omitted here.

7) If the master system is in the state S4 or S5 and the slave system is in the state S0 when they are detached, then after they are attached, the slave system will maintain its state S0 and the master system will be automatically activated and switched from the state S4 or S5 to the state S0. The above three schemes also apply and the details thereof will be omitted here.

8) If the master system is in the state S4 or S5 and the slave system is in the state S3 when they are detached, then after they are attached, the master system will maintain its state S4 or S5 and the slave system will maintain its state S3. The above three schemes also apply and the details thereof will be omitted here.

9) If the master system is in the state S4 or S5 and the slave system is in the state S4 or S5 when they are detached, then after they are attached, each of the master system and the slave system will maintain the state S4 or S5. The above three schemes also apply and the details thereof will be omitted here.

It is to be noted here that the above examples are only given for illustrating that the portable terminal system is capable of automatically control its state transition. In practice, the policy can be adapted depending on the user's requirements. The present application is not limited to this. For example, if the master system is in the state S0 and the slave system is in the state S3 when they are detached, the master system and the slave system may maintain their respective states after they are attached.

Figure 4:
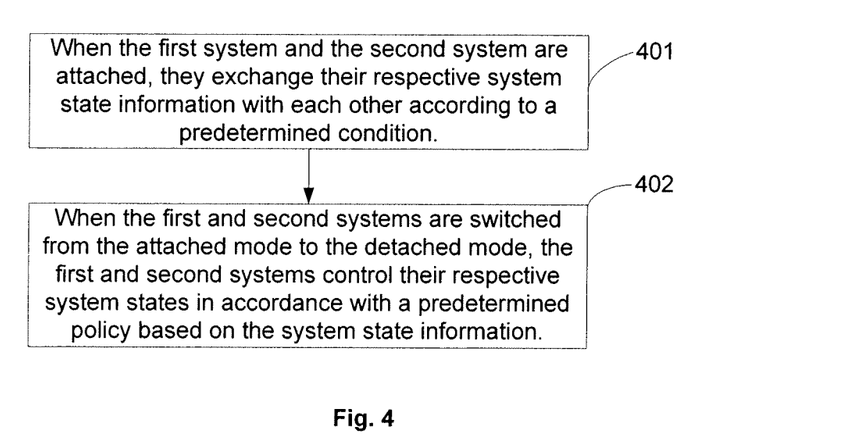
FIG. 4 is a flowchart illustrating a fourth embodiment of the state control method according to the present application.

Reference is now made to FIG. 4 which is a flowchart illustrating a fourth embodiment of the state control method according to the present application. This embodiment describes the state control process when the first and second systems are switched from the attached mode to the detached mode.

At step 401, when the first system and the second system are attached, they exchange their respective system state information with each other according to a predetermined condition.

When the first system and the second system are attached, they need to exchange their respective system state information with each other in order to automatically control their system states after they are detached based on their original system state information. The system state information can be exchanged according to a predetermined condition. For example, the first system and the second system can exchange their respective system state information with each other at a predetermined time interval. Alternatively, the first system and the second system can exchange their respective system state information with each other in real time. Alternatively, when the system state of one of the first and second systems is changed, the other one of the first and second systems is sent a notification message containing the changed system state information.

At step 402, when the first and second systems are switched from the attached mode to the detached mode, the first and second systems control their respective system states in accordance with a predetermined policy based on the system state information.

Here, in accordance with the predetermined policy, if the first system and the second system are both in the active state, after they are detached, the first system will enter the inactive state and the second system will enter the active state. If the first system is in the inactive state and the second system is in the active state, after they are detached, the first system will enter the active state and the second system will maintain its own system state. The system states include the active state and the inactive state.

There are two schemes for the system state control, as described in the following.

In the first scheme, the first system controls its own system state in accordance with a predetermined policy based on the system state information of its own and the system state information of the second system. Meanwhile, the second system controls its own system state in accordance with a predetermined policy based on the system state information of its own and the system state information of the first system.

In the second scheme, the first system controls its own system state in accordance with a predetermined policy based on its own system state information; and/or the second system controls its own system state in accordance with a predetermined policy based on its own system state information.

With reference to the fourth embodiment as described above, the control process for state transition will be explained below. Here it is again assumed that the first system is a master system and the second system is a slave system. It is further assumed that the first and second systems are switched from the attached mode to the detached mode.

1) If the master system is in the state S0 and the slave system is in the state S0 when they are attached, then after they are detached, the master system will enter the state S3 and the slave system will maintain its state S0. In a notebook computer with dual systems as an example, when the two systems are detached, the user typically needs to use the function of the slave system independently. Thus, the master system is automatically controlled to enter the standby state for power-saving, while the slave system maintains its normal operation state such that it can be used by the user. In this way, it is possible to achieve a seamless switching.

2) If the master system is in the state S0 and the slave system is in the state S3 when they are attached, then after they are detached, the master system will enter the state S3 and the slave system will be switched from the state S3 to the state S0. In a notebook computer with dual systems as an example, when the two systems are detached, the user typically needs to use the function of the slave system independently. Thus, the master system is automatically controlled to enter the standby state for power-saving, while the slave system is automatically switched from the standby state to the normal operation state such that it can be directly used by the user. In this way, there is no need for the user to press a button to activate the slave system.

3) If the master system is in the state S0 and the slave system is in the state S4 or S5 when they are attached, then after they are detached, the master system will enter the state S3 and the slave system will be automatically activated and thus switched from the state S4 or S5 to the state S0.

4) If the master system is in the state S3 and the slave system is in the state S0 when they are attached, then after they are detached, the master system will maintain its state S3 and the slave system will maintain its state S0.

5) If the master system is in the state S3 and the slave system is in the state S3 when they are attached, then after they are detached, each of the master system and the slave system will maintain their state S3.

6) If the master system is in the state S3 and the slave system is in the state S4 or S5 when they are attached, then after they are detached, the master system will maintain its state S3 and the slave system will maintain its state S4 or S5.

7) If the master system is in the state S4 or S5 and the slave system is in the state S0 when they are attached, then after they are detached, the master system will maintain its state S4 or S5 and the slave system will maintain its state S0.

8) If the master system is in the state S4 or S5 and the slave system is in the state S3 when they are attached, then after they are detached, the master system will maintain its state S4 or S5 and the slave system will maintain its state S3.

9) If the master system is in the state S4 or S5 and the slave system is in the state S4 or S5 when they are attached, then after they are detached, each of the master system and the slave system will maintain the state S4 or S5.

It is to be noted here that the above examples are only given for illustrating that the portable terminal system is capable of automatically control its state transition. In practice, the policy can be adapted depending on the user's requirements. The present application is not limited to this. For example, if the master system is in the state S0 and the slave system is in the state S3 when they are attached, the master system and the slave system may maintain their respective states after they are detached.

Figure 5:
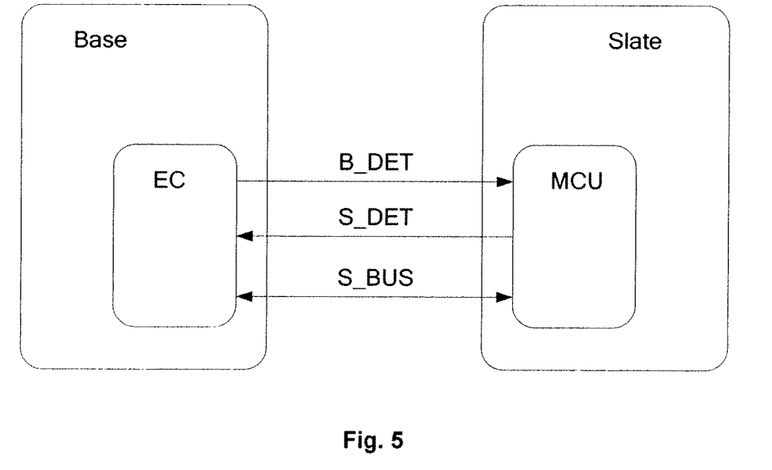
FIG. 5 is a schematic diagram showing the structure of a portable terminal where the state control method according to the present application can be applied.

Reference is now made to FIG. 5, which is a schematic diagram showing the structure of a portable terminal where the state control method according to the present application can be applied.

As shown, there is a master system, Base, including an Embedded Controller (EC) and a slave system, Slate, including a Micro Control Unit (MCU). Each of the EC and the MCU is provided with physical interfaces having detection and communication channels. As shown in FIG. 5, B_DET is configured to transmit a first signal of Base from the EC to the MCU. When the master system and the slave system are attached, B_DET corresponds to the detection channel of the MCU. In this way, Slate can detect whether Base is present or not based on the first signal. S_DET is configured to transmit a second signal of Slate from the MCU to the EC. When the master system and the slave system are attached, S_DET corresponds to the detection channel of the EC. In this way, Base can detect whether Slate is present or not based on the second signal. S_BUS is a serial communication bus such as I2C (Inter-Integrated Circuit), SPI (Serial Peripheral Interface), UART (Universal Asynchronous Receiver/Transmitter) and the like. This serial communication bus includes a necessary interruption line for transmitting the system states of Base and Slate between the EC and the MCU. When the master system and the slave system are attached, S_BUS becomes the communication channel between the master and slave systems. Further, B_DET, the detection channel and S_BUS can be at least a part of the first interface of the master system. S_DET, the detection channel and S_BUS can be at least a part of the second interface of the slave system.

Corresponding to the embodiments of the state control method, embodiments of the state control apparatus and the portable terminal are also provided according to the present application.

Figure 6:
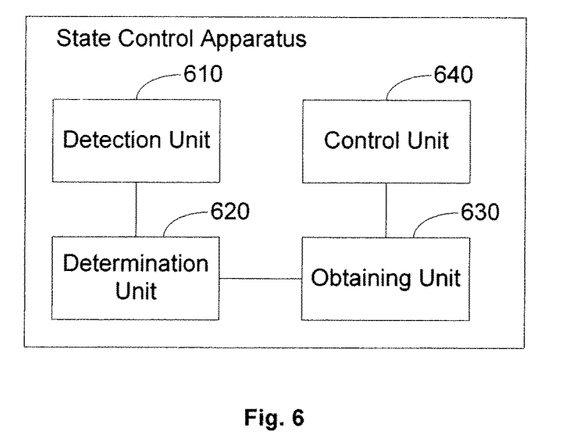
FIG. 6 is a block diagram of a first embodiment of the state control apparatus according to the present application.

FIG. 6 is a block diagram of a first embodiment of the state control apparatus according to the present application. The apparatus is applied in a first system connected to a second system. The apparatus includes a detection unit 610, a determination unit 620, an obtaining unit 630 and a control unit 640.

The detection unit 610 is configured to detect a first event.

The determination unit 620 is configured to detect a first state of the first system and a second state of the second system when the first event is a first predetermined event.

The obtaining unit 630 is configured to obtain a predetermined policy including a first control command and a second control command based on the first state of the first system, the second state of the second system and the first predetermined event.

The control unit 640 is configured to control the first system's own state based on the first control command and transmit the second control command to the second system such that the second system is switched from the second state to a fourth state. The second system has different power consumptions in the second state and the fourth state.

In particular, the control unit 640 can include at least one of (not shown in FIG. 6): a first control unit configured to maintain the first system's own state based on the first control command; and a second control unit configured to switch the first system's own state from the first state to a third state. The first system has different power consumptions in the first state and the third state.

In particular, the detection unit 610 can include at least one of (not shown in FIG. 6): a first detection unit configured to detect a predetermined event that causes an increased power consumption of the second system; or a second detection unit configured to detect a predetermined event that causes a decreased power consumption of the second system.

The predetermined event detected by the first detection unit can include at least one of: an event in which the first detection unit detects that the first system is powered on in response to a user operation; an event in which the first detection unit detects that the first system is waked in response to a user operation; and an event in which the first detection unit detects that the first system needs to use a communication module of the second system.

Accordingly, the predetermined policy can include at least one of: a policy to generate the first control command and the second control command for switching the first system and the second system from a power-off state to an active state, respectively, when the first state of the first system and the second state of the second system are both in the power-off state and the first predetermined event is the event in which the first system is powered on in response to a user operation; a policy to generate the first control command for controlling the first system to maintain an active state and the second control command for controlling the second system to enter an communication state when the first state of the first system and the second state of the second system are both in the active state and the first predetermined event is the event in which the first system needs to use the communication module of the second system; a policy to generate the first control command and the second control command for switching the first system and the second system from a dormant state to an active state, respectively, when the first state of the first system and the second state of the second system are both in the dormant state and the first predetermined event is the event in which the first system is waked in response to a user operation; a policy to generate the first control command for switching the first system from a power-off state to an active state and the second control command for switching the second system from a dormant state to an active state when the first state of the first system is in the power-off state, the second state of the second system is in the dormant state and the first predetermined event is the event in which the first system is powered on in response to a user operation; and a policy to generate the first control command for switching the first system from a dormant state to an active state and the second control command for switching the second system from a power-off state to an active state when the first state of the first system is in the dormant state, the second state of the second system is in the power-off state and the first predetermined event is the event in which the first system is waked in response to a user operation.

The predetermined event detected by the second detection unit can include at least one of: an event in which the second detection unit detects that the first system is powered off in response to a user operation; an event in which the second detection unit detects that the first system is controlled to dormant in response to a user operation; an event in which the second detection unit detects that a power level of the first and second systems is lower than a predetermined threshold; and an event in which the second detection unit detects that the first system needs to stop using a communication module of the second system.

Accordingly, the predetermined policy includes at least one of: a policy to generate the first control command and the second control command for switching the first system and the second system from an active state to a power-off state, respectively, when the first state of the first system and the second state of the second system are both in the active state and the first predetermined event is the event in which the power level of the first and second systems is lower than the predetermined threshold; a policy to generate the first control command for switching the first system from an active state to a power-off state and the second control command for switching the second system from a communication state to an active state when the first state of the first system is in the active state, the second state of the second system is in the communication state and the first predetermined event is the event in which the first system is powered off in response to a user operation; a policy to generate the first control command for switching the first system from an active state to a dormant state and the second control command for switching the second system from a communication state to a dormant state when the first state of the first system is in the active state, the second state of the second system is in the communication state and the first predetermined event is the event in which the first system is controlled to dormant in response to a user operation; and a policy to generate the first control command for controlling the first system to maintain an active state and the second control command for switching the second system from a communication state to an active state when the first state of the first system is in the active state, the second state of the second system is in the communication state and the first predetermined event is the event in which the first system needs to stop using the communication module of the second system.

In particular, the first system may be a notebook computer, a mobile phone or a tablet computer having a display device (such as a display screen based on LCD, LED or any other light emitting technique), or may be a host part (e.g., Base) of a notebook computer of hybrid system architecture that does have a display device, as described above. The first system includes a physical interface (e.g., a USB interface or a custom interface), an input device (e.g., a physical keyboard and/or a cursor control device such as a pointing stick or a point/multipoint touchpad), and a processor (such as a Central Processing Unit (CPU)) or a processor group (CPU and EC). Here, the processor or the processor group can include the detection unit, the determination unit, the obtaining unit and the control unit. These units included in the processor can be implemented in software, or in hardware circuits based on the current hardware process, regardless of their costs. Such hardware circuits include conventional Very Large Scale Integrated (VLSI) circuits, gate arrays, semiconductor elements such as logic chips and transistors, or other discrete elements. They can also be implemented using programmable hardware devices, such as Field Programmable Gate Array, Programmable Logic Array and Programmable logic device.

Figure 7:
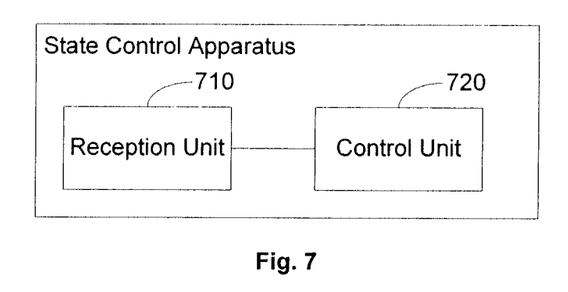
FIG. 7 is a block diagram of a second embodiment of the state control apparatus according to the present application.

FIG. 7 is a block diagram of a second embodiment of the state control apparatus according to the present application. The apparatus is applied in a second system connected to a first system. The apparatus includes a reception unit 710 and a control unit 720.

The reception unit 710 is configured to receive a second control command transmitted from the first system.

The control unit 720 is configured to switch the second system from a second state to a fourth state based on the second control command. The second system has different power consumptions in the second state and the fourth state.

The second control command is transmitted by the first system according to a predetermined policy after the predetermined policy is obtained by the first system, upon detecting a first predetermined event, based on a first state of the first system, a second state of the second system and the first predetermined event.

Figure 8:
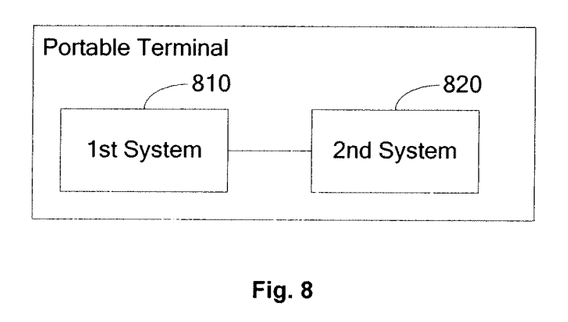
FIG. 8 is a block diagram of an embodiment of the portable terminal according to the present application.

FIG. 8 is a block diagram of an embodiment of the portable terminal according to the present application. The portable terminal includes a first system 810 and a second system 820 connected to the first system 810.

The first system 810 is configured to: detect a first event, determine a first state of the first system and a second state of the second system when the first event is a first predetermined event, obtain a predetermined policy including a first control command and a second control command based on the first state of the first system, the second state of the second system and the first predetermined event, and control its own state based on the first control command and transmit the second control command to the second system.

The second system 820 is configured to switch from the second state to a fourth state based on the second control command. The second system has different power consumptions in the second state and the fourth state.

The first system 810 is further configured to control state transition of the first system based on its own state transition policy after being disconnected from the second system. The power consumption of the first system after the state transition is different from that before the state transition.

The second system 820 is further configured to control state transition of the second system based on its own state transition policy after being disconnected from the first system. The power consumption of the second system after the state transition is different from that before the state transition.

In particular, the functions of the above first and second systems are the same as those described above with respect to the embodiments of the apparatuses of systems shown in FIGS. 6 and 7 and thus the detailed description thereof will be omitted here.

In particular, the second system may be a notebook computer, a mobile phone or a tablet computer having a display device (such as a display screen based on LCD, LED or any other light emitting technique), or may be a tablet part (e.g., Slate) of a notebook computer of hybrid system architecture that has a display device, as described above. The first system includes a physical interface (e.g., a USB interface or a custom interface), an input device (e.g., a point/multipoint touch sensitive unit), a processor or a processor group, and a display device. Here, the input device and the display device can be overlapped to form a touch screen. The processor (such as a Central Processing Unit (CPU)) or the processor group (CPU and MCU) can include the reception unit and the control unit. These units included in the processor can be implemented in software, or in hardware circuits based on the current hardware process, regardless of their costs. Such hardware circuits include conventional Very Large Scale Integrated (VLSI) circuits, gate arrays, semiconductor elements such as logic chips and transistors, or other discrete elements. They can also be implemented using programmable hardware devices, such as Field Programmable Gate Array, Programmable Logic Array and Programmable logic device.

In the embodiments as described above, a first system is connected to a second system. The first system detects a first event, determines a first state of the first system and a second state of the second system when the first event is a first predetermined event and obtains a predetermined policy including a first control command and a second control command based on the first state of the first system, the second state of the second system and the first predetermined event. The first system controls its own state based on the first control command and transmits the second control command to the second system such that the second system is switched from the second state to a fourth state. The second system has different power consumptions in the second state and the fourth state. With the embodiments of the present application, in a portable terminal of hybrid system architecture, the system states of the first and second systems can be controlled in a coordinated manner by providing a state control process when they are connected, such that the power consumption can be reduced when both systems are operating cooperatively.

It can be appreciated by those skilled in the art that the techniques according to the embodiments of the present application can be implemented in software in combination with a necessary general purpose hardware platform. In view of this, the technical solutions according to the embodiments of the present application, or in other words a part thereof which makes contribution over the prior art, can be substantially embodied in a form of software product. The computer software product can be stored in a storage media, such as ROM/RAM, magnetic disk, optical disc and the like, containing instructions which cause a computer device (which can be a personal computer, a server, a network device or the like) to perform one or more methods according to the embodiments of the present application or particular parts thereof.

The embodiments in the specification are described in a progressive manner. The same or similar elements of the respective embodiments may refer to each other. The description of any embodiment focuses on the difference compared with other embodiments. In particular, the embodiments of the system correspond to the embodiments of the method. Thus, the embodiments of the system are only described briefly and reference can be made to the embodiments of the method for further details.

The embodiments of the present application as described above do not limit the scope of the present application which should encompass all variations, equivalents and modifications that fall within the principle and spirit of the present application.

What is claimed is:

1. A state control method applied in a first system connected to a second system, the first system including a first hardware system having a first operating system and the second system including a second hardware system having a second operating system, the method comprising:
   detecting, by the first system, a first event;
   determining, by the first system, a first state of the first system and a second state of the second system when the first event is a first predetermined event;
   obtaining, by the first system from a plurality of predetermined policies, a corresponding policy including a first control command for the first system and a second control command for the second system based on the first state of the first system, the second state of the second system and the first predetermined event; and
   the first system controlling its own state based on the first control command and transmitting the second control command to the second system such that the second system is switched from the second state to a fourth state, wherein the second system has different power consumptions in the second state and the fourth state,
   wherein the first predetermined event detected by the first system comprises a predetermined event detected by the first system that causes an increased power consumption of the second system or a predetermined event detected by the first system that causes a decreased power consumption of the second system;
   wherein the predetermined event detected by the first system that causes an increased power consumption of the second system comprises an event in which the first system detects that the first system needs to use a communication module of the second system;
   wherein the plurality of predetermined policies comprise:
   a policy to generate the first control command for controlling the first system to maintain an active state and the second control command for controlling the second system to enter an communication state when the first state of the first system and the second state of the second system are both in the active state and the first predetermined event is the event in which the first system needs to use the communication module of the second system.

2. The method of claim 1, wherein the first system controlling its own state based on the first control command comprises:
   the first system maintaining its own state based on the first control command; or
   the first system switching its own state from the first state to a third state, wherein the first system has different power consumptions in the first state and the third state.

3. The method of claim 1, wherein the plurality of predetermined policies further comprise:
   a policy to generate the first control command for switching the first system from a power-off state to an active state and the second control command for switching the second system from a dormant state to an active state when the first state of the first system is in the power-off state, the second state of the second system is in the dormant state and the first predetermined event is the event in which the first system is powered on in response to a user operation; and
   a policy to generate the first control command for switching the first system from a dormant state to an active state and the second control command for switching the second system from a power-off state to an active state when the first state of the first system is in the dormant state, the second state of the second system is in the power-off state and the first predetermined event is the event in which the first system is waked in response to a user operation.

4. The method of claim 1, wherein the predetermined event detected by the first system that causes a decreased power consumption of the second system comprises at least one of:
   an event in which the first system detects that the first system is powered off in response to a user operation;
   an event in which the first system detects that a power level of the first and second systems is lower than a predetermined threshold; and
   an event in which the first system detects that the first system needs to stop using a communication module of the second system.

5. The method of claim 4, wherein the plurality of predetermined policies comprise:
   a policy to generate the first control command and the second control command for switching the first system and the second system from an active state to a power-off state, respectively, when the first state of the first system and the second state of the second system are both in the active state and the first predetermined event is the event in which the power level of the first and second systems is lower than the predetermined threshold;
   a policy to generate the first control command for switching the first system from an active state to a power-off state and the second control command for switching the second system from a communication state to an active state when the first state of the first system is in the active state, the second state of the second system is in the communication state and the first predetermined event is the event in which the first system is powered off in response to a user operation; and/or
   a policy to generate the first control command for controlling the first system to maintain an active state and the second control command for switching the second system from a communication state to an active state when the first state of the first system is in the active state, the second state of the second system is in the communication state and the first predetermined event is the event in which the first system needs to stop using the communication module of the second system.

6. A state control apparatus applied in a first system connected to a second system, the first system including a first hardware system having a first operating system and the second system including a second hardware system having a second operating system, the apparatus comprising:
   a detection unit configured to detect a first event;
   a determination unit configured to detect a first state of the first system and a second state of the second system when the first event is a first predetermined event;
   an obtaining unit configured to obtain, from a plurality of predetermined policies, a corresponding policy including a first control command for the first system and a second control command for the second system based on the first state of the first system, the second state of the second system and the first predetermined event; and a control unit configured to control the first system's own state based on the first control command and transmit the second control command to the second system such that the second system is switched from the second state to a fourth state, wherein the second system has different power consumptions in the second state and the fourth state;

wherein the detection unit comprises at least one of a first detection unit configured to detect a predetermined event that causes an increased power consumption of the second system or a second detection unit configured to detect a predetermined event that causes a decreased power consumption of the second system;

wherein the predetermined event detected by the first detection unit comprises an event in which the first detection unit detects that the first system needs to use a communication module of the second system;

wherein the plurality of predetermined policies comprise:

a policy to generate the first control command for controlling the first system to maintain an active state and the second control command for controlling the second system to enter an communication state when the first state of the first system and the second state of the second system are both in the active state and the first predetermined event is the event in which the first system needs to use the communication module of the second system.

7. The apparatus of claim 6, wherein the control unit comprises at least one of:

a first control unit configured to maintain the first system's own state based on the first control command; and a second control unit configured to switch the first system's own state from the first state to a third state, wherein the first system has different power consumptions in the first state and the third state.

8. The apparatus of claim 6, wherein the plurality of predetermined policies further comprise:

a policy to generate the first control command for switching the first system from a power-off state to an active state and the second control command for switching the second system from a dormant state to an active state when the first state of the first system is in the power-off state, the second state of the second system is in the dormant state and the first predetermined event is the event in which the first system is powered on in response to a user operation; and/or a policy to generate the first control command for switching the first system from a dormant state to an active state and the second control command for switching the second system from a power-off state to an active state when the first state of the first system is in the dormant state, the second state of the second system is in the power-off state and the first predetermined event is the event in which the first system is waked in response to a user operation.

9. The apparatus of claim 6, wherein the predetermined event detected by the second detection unit comprises at least one of:

an event in which the second detection unit detects that the first system is powered off in response to a user operation;

an event in which the second detection unit detects that a power level of the first and second systems is lower than a predetermined threshold; and an event in which the second detection unit detects that the first system needs to stop using a communication module of the second system.

10. The apparatus of claim 9, wherein the plurality of predetermined policies comprise:

a policy to generate the first control command and the second control command for switching the first system and the second system from an active state to a power-off state, respectively, when the first state of the first system and the second state of the second system are both in the active state and the first predetermined event is the event in which the power level of the first and second systems is lower than the predetermined threshold;

a policy to generate the first control command for switching the first system from an active state to a power-off state and the second control command for switching the second system from a communication state to an active state when the first state of the first system is in the active state, the second state of the second system is in the communication state and the first predetermined event is the event in which the first system is powered off in response to a user operation; and/or a policy to generate the first control command for controlling the first system to maintain an active state and the second control command for switching the second system from a communication state to an active state when the first state of the first system is in the active state, the second state of the second system is in the communication state and the first predetermined event is the event in which the first system needs to stop using the communication module of the second system.

11. A state control apparatus applied in a second system connected to a first system, the first system including a first hardware system having a first operating system and the second system including a second hardware system having a second operating system, the apparatus comprising:

a reception unit configured to receive a second control command for the second system transmitted from the first system; and a control unit configured to switch the second system from a second state to a fourth state based on the second control command, the second system having different power consumptions in the second state and the fourth state, wherein the second control command is transmitted by the first system according to a predetermined policy after the predetermined policy is obtained by the first system, upon detecting a first predetermined event, based on a first state of the first system, a second state of the second system and the first predetermined event;

wherein the detection unit comprises at least one of a first detection unit configured to detect a predetermined event that causes an increased power consumption of the second system or a second detection unit configured to detect a predetermined event that causes a decreased power consumption of the second system;

wherein the predetermined event detected by the first system that causes an increased power consumption of the second system comprises an event in which the first detection unit detects that the first system needs to use a communication module of the second system;

wherein the predetermined policy comprises:

a policy to generate the first control command for controlling the first system to maintain an active state and the second control command for controlling the second system to enter an communication state when the first state of the first system and the second state of the second system are both in the active state and the first predetermined event is the event in which the first system needs to use the communication module of the second system.

12. A portable terminal, comprising a first system and a second system connected to the first system, the first system including a first hardware system having a first operating system and the second system including a second hardware system having a second operating system, wherein
the first system is configured to:
detect a first event,
determine a first state of the first system and a second state of the second system when the first event is a first predetermined event,
obtain, from a plurality of predetermined policies, a corresponding policy including a first control command for the first system and a second control command for the second system based on the first state of the first system, the second state of the second system and the first predetermined event, and
control its own state based on the first control command and transmit the second control command to the second system; and
the second system is switched from the second state to a fourth state based on the second control command, the second system having different power consumptions in the second state and the fourth state;
wherein the first predetermined event detected by the first system comprises a predetermined event detected by the first system that causes an increased power consumption of the second system or a predetermined event detected by the first system that causes a decreased power consumption of the second system;
wherein the predetermined event detected by the first system that causes an increased power consumption of the second system comprises an event in which the first system detects that the first system needs to use a communication module of the second system;
wherein the corresponding policy comprises:
a policy to generate the first control command for controlling the first system to maintain an active state and the second control command for controlling the second system to enter an communication state when the first state of the first system and the second state of the second system are both in the active state and the first predetermined event is the event in which the first system needs to use the communication module of the second system.

13. The portable terminal of claim 12, wherein
the first system is further configured to control state transition of the first system based on its own state transition policy after being disconnected from the second system, the power consumption of the first system after the state transition being different from that before the state transition; and
the second system is further configured to control state transition of the second system based on its own state transition policy after being disconnected from the first system, the power consumption of the second system after the state transition being different from that before the state transition.

* * * * *